US006538415B1

(12) United States Patent
Fang et al.

(10) Patent No.: US 6,538,415 B1
(45) Date of Patent: *Mar. 25, 2003

(54) TEMPERATURE SENSING DEVICE FOR A BATTERY

(76) Inventors: Shou-Mean Fang, 2419 Hong Qiao Road, #20 Sassoon Park, Shanghai (CN), 200335; Takashi Hasunuma, 6-15-10, Tamazukuri Narita City, Chiba (JP); Noriyuki Nagashima, 2-2-10 Misatodai, Naritashi, Chiba 286-0013 (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/288,045

(22) Filed: Apr. 7, 1999

(30) Foreign Application Priority Data

Apr. 7, 1998 (JP) .......................... 10-095019

(51) Int. Cl.[7] .................................. H02J 7/04
(52) U.S. Cl. ................. 320/150; 320/DIG. 18
(58) Field of Search ................ 320/150, DIG. 18; 324/431, 435

(56) References Cited

U.S. PATENT DOCUMENTS 4,967,176 A    10/1990  Horsma et al. .......... 338/22 R
5,389,470 A *   2/1995  Parker et al. ............... 429/90
5,460,902 A * 10/1995  Parker et al. .............. 324/426
5,478,665 A * 12/1995  Burroughs et al. .......... 429/90
5,600,231 A *   2/1997  Parker ..................... 320/125
5,645,746 A *   2/1997  Walsh ..................... 219/505
5,841,285 A *   7/1997  Bailey ............... 320/DIG. 18
5,864,281 A *   1/1999  Zhang et al. ............ 338/22 R
6,137,669 A   10/2000  Chiang et al. ............. 361/103

FOREIGN PATENT DOCUMENTS

JP    1-117541    8/1989
JP   10-270094   10/1998
JP    2880200    4/1999

OTHER PUBLICATIONS

Japanese Patent Office International Search Report for International Application No. PCT/JP99/01789 dated Jun. 1, 1999.

* cited by examiner

Primary Examiner—Edward H. Tso
Assistant Examiner—Pia Tibbits

(57) ABSTRACT

A temperature-sensing apparatus 11 which is placed in contact with a plurality of batteries, e.g. secondary batteries, connected in series. The temperature sensing apparatus can be connected to a power source 12 and a current measuring device 13 to detect increases in the temperature of the battery. Each temperature-sensing section in contact with individual secondary batteries comprises a PTC element and electrode sheets in contact with and sandwiching the PTC element on the top and bottom, the electrode sheets being in a staggered and overlapping relationship.

15 Claims, 4 Drawing Sheets

TEMPERATURE SENSING DEVICE FOR A BATTERY

BACKGROUND OF THE INVENTION

1. Field of the Invention

This invention relates to batteries and a temperature-sensing apparatus for a batteries.

2. Introduction to the Invention

Secondary, i.e. rechargeable, batteries such as nickel hydride batteries and lithium ion batteries having lighter weight and larger capacity compared to conventional lead batteries have been developed and used in various applications in recent years. One application for such secondary batteries which makes use of their light weight and large capacity characteristics, is an electric vehicle which uses an electric motor as the power source, or a hybrid vehicle which combines an electric motor and an internal engine as the power source.

In order to increase the maximum voltage and current capacity available with a single secondary battery, a plurality of batteries can be connected in series in an assembly to obtain the specified voltage; these assemblies may be further connected in parallel to obtain the desired current capacity for use as a power source requiring a large driving force for applications such as the electric or hybrid vehicle.

Charging, which is required when using secondary batteries, is performed by applying the charging voltage to the assembly of secondary batteries connected in series. Since it is difficult to have uniformity in the charge and discharge characteristics of secondary batteries even with the strictest quality control, variations in the internal resistance, which changes depending on the charged state or the discharge state of the battery, are also inevitable. Therefore, when a plurality of secondary batteries having differing internal resistances are connected in series and a charging voltage is applied to the assembly of such batteries, a current passes uniformly through all the cells, causing in some cases a large rise in temperature in the secondary batteries having a large internal resistance. Such temperature rises in the secondary batteries not only shorten the life of the battery, but may also damage the casing surrounding the battery.

One way to solve such a problem is to apply the specified voltage to the two ends of each secondary battery and at the same time control the charging current, but it is difficult to provide individual charging circuits to an assembly comprising many secondary batteries.

Therefore, it becomes necessary to sense abnormal temperature rises as described above while charging secondary batteries and to stop charging the batteries which behave abnormally. One method is to sense temperature rises using a bimetal contact method. In this method, however, the contact members of the bimetallic switch may stick together when chattering caused by the on/off action at the contact occurs, so that the contact no longer functions as a switch. In addition, there can be a problem with safety.

A method utilizing a PTC (positive temperature coefficient) device has also been used to sense temperature in secondary batteries. The PTC device is in thermal contact with the object being measured so that the surface temperature of the object can be transmitted to the PTC device. The PTC device contains material which has the characteristic of exhibiting low electrical resistance at relatively low temperatures, e.g. room temperature, but exhibiting a very high resistance when exposed to high temperatures such as those which result when an abnormally large current flows through the object being measured. Previously, when PTC devices were used to sense abnormal temperature rises in secondary batteries, particularly during charging, a plurality of secondary batteries was connected in series, and devices or sensors using the PTC material were individually attached to each of the secondary batteries when being charged. In this method, however, it was not easy to attach individual sensors, and there was also the problem of complex wiring between the sensors and the temperature sensing circuit for processing data from the sensors.

BRIEF SUMMARY OF THE INVENTION

We have now discovered a novel temperature-sensing apparatus which is particularly useful for monitoring the temperature of a plurality of batteries, e.g. secondary batteries installed in an electric vehicle. The present invention can be used to sense the temperature of a single secondary battery or a plurality of secondary batteries connected in series. The resulting apparatus has a low cost of manufacture and a high reliability during use, e.g. due to the presence of few welded sections in contrast to conventional sensing apparatus. In addition, the apparatus can be manufactured in various shapes. In a first aspect, the invention provides an elongate temperature-sensing apparatus which can be connected to an electrical power supply to provide a sensor for monitoring the temperature of a plurality of batteries, the apparatus comprising (A) a positive temperature coefficient (PTC) element which
   (1) is in the form of a continuous elongate tape having opposite first and second surfaces, and
   (2) comprises a conductive polymer exhibiting PTC behavior;

(B) a plurality of first electrodes which
   (1) are secured to the first surface of the PTC element, and
   (2) are longitudinally spaced apart from each other;

(C) a plurality of second electrodes which
   (1) are secured to the second surface of the PTC element, and
   (2) are longitudinally spaced apart from each other,
     the first and second electrodes being in a staggered and overlapping relationship, so that each electrode has (a) a central portion which does not overlap an electrode on the opposite surface and (b) two end portions which overlap respective end portions of adjacent electrodes on the opposite surface;

(D) a polymeric insulating jacket which surrounds the PTC element and the first and second electrodes, (E) a plurality of longitudinally spaced-apart sensing components, each sensing component comprising
   (1) an overlapping end portion of one of the first electrodes,
   (2) an overlapping end portion of one of the second electrodes, and
   (3) a portion of the PTC element, through which current runs transversely between the overlapping end portions of the electrodes when the apparatus is connected to a power supply; and (F) a plurality of longitudinally spaced-apart connecting components, each connecting component
   (1) connecting two adjacent sensing components electrically in series, and (2) comprising
  (a) a portion of the PTC element, and
  (b) a central portion of one of the first electrodes or a central portion of one of the second electrodes, through which current will run longitudinally when the apparatus is connected to a power supply.

In a second aspect, the invention provides a temperature-sensing apparatus which comprises (A) a plurality of longitudinally spaced-apart sensing components, each sensing component comprising
  (1) a positive temperature coefficient (PTC) element which
    (a) is in the form of a laminar sheet having opposite first and second surfaces, and
    (b) comprises a conductive polymer exhibiting PTC behavior;
  (2) a first electrode which is secured to the first surface of the PTC element, and
  (3) a second electrode which is secured to the second surface of the PTC element, and
(B) a plurality of longitudinally spaced-apart connecting components, each connecting component lying between two adjacent sensing components and the connecting components being alternately connected
  (1) to the first electrodes of the adjacent sensing components, and
  (2) to the second electrodes of the adjacent sensing components;
    whereby, when the apparatus is connected to a power supply, current runs transversely through the PTC elements and longitudinally through the connecting components.

In a third aspect this invention provides a process for manufacturing a temperature-sensing apparatus of the first or second aspect of the invention, said process comprising the following steps:

(A) providing a laminar element comprising
  (1) a sheet having opposite first and second surfaces and composed of a conductive polymer composition exhibiting PTC behavior,
  (2) a first metal sheet affixed to the first surface of the sheet, and
  (3) a second metal sheet affixed to the second surface of the sheet;
(B) forming a plurality of first grooves by removing a first plurality of parallel strips from the first metal sheet;
(C) forming a plurality of second grooves by removing the a second plurality of parallel strips from the second metal sheet, wherein the first and second grooves are parallel to each other, staggered, and not overlapping;
(D) preparing a plurality of components in tape form by dividing the product resulting from step (C) along lines perpendicular to the first and second grooves; and
(E) forming a polymer insulating component around each component in tape form.

In a fourth aspect this invention provides a battery assembly comprising (A) a plurality of batteries, and
(B) a temperature-sensing apparatus as claimed in the first aspect of the invention,
  wherein each battery is provided with at least one sensing component in thermal contact therewith.

DETAILED DESCRIPTION OF THE INVENTION

Figure 1:
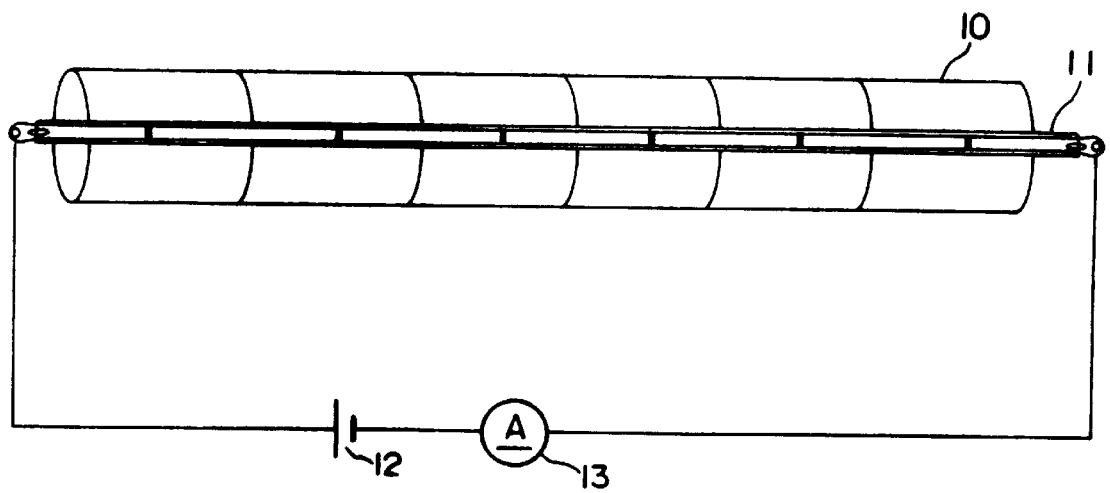
FIG. 1 is a perspective schematic view showing an assembly of secondary batteries provided with a temperature-sensing apparatus according to the invention.

The present invention is an elongate temperature-sensing apparatus which can be connected to an electrical power supply to provide a sensor for monitoring the temperature of a single battery or a plurality of batteries or other substrates. The apparatus comprises a positive temperature coefficient (PTC) element which is in the form of a continuous elongate tape having opposite first and second surfaces. the element comprises a conductive polymer exhibiting PTC behavior, i.e. an increase in temperature with resistance. A plurality of first electrodes are secured to the first surface of the PTC element, and are longitudinally spaced apart from each other; and a plurality of second electrodes are secured to the second surface of the PTC element, and longitudinally spaced apart from each other. The first and second electrodes are in a staggered and overlapping relationship, so that each electrode has (a) a central portion which does not overlap an electrode on the opposite surface and (b) two end portions which overlap respective end portions of adjacent electrodes on the opposite surface. In a preferred embodiment, a polymeric insulating jacket surrounds the PTC element and the first and second electrodes. The apparatus also comprises a plurality of longitudinally spaced-apart sensing components, each sensing component comprising an overlapping end portion of one of the first electrodes, an overlapping end portion of one of the second electrodes, and a portion of the PTC element, through which current runs transversely between the overlapping end portions of the electrodes when the apparatus is connected to a power supply. The apparatus also comprises a plurality of longitudinally spaced-apart connecting components, each connecting component connecting two adjacent sensing components electrically in series, and comprising a portion of the PTC element, and a central portion of one of the first electrodes or a central portion of one of the second electrodes, through which current will run longitudinally when the apparatus is connected to a power supply.

In another embodiment the temperature-sensing apparatus comprises a plurality of longitudinally spaced-apart sensing components, each sensing component comprising a positive temperature coefficient (PTC) element which is in the form of a laminar sheet having opposite first and second surfaces, and comprises a conductive polymer exhibiting PTC behavior. Each sensing component also comprises a first electrode which is secured to the first surface of the PTC element, and a second electrode which is secured to the second surface of the PTC element. Also part of the apparatus are a plurality of longitudinally spaced-apart connecting components, each connecting component lying between two adjacent sensing components and the connecting components being alternately connected to the first electrodes of the adjacent sensing components, and to the second electrodes of the adjacent sensing components, whereby, when the apparatus is connected to a power supply, current runs transversely through the PTC elements and longitudinally through the connecting components.

It is preferred that the conductive polymer having a volume resistivity of at most 8 ohm-cm or less at 23° C., and that the resistance value of the sensing components be at most 5 ohms at 23° C. and at least 100 ohms at 90° C.

The first and second electrodes may be a metal foil electrode.

In a preferred embodiment, the sensing components are substantially identical to one another and are placed uniformly spaced apart on the elongate temperature-sensing apparatus. The spacing between the sensing components, i.e. the spacing between the corresponding points of adjacent sensing components, is preferably repeated at a distance of between 10 mm and 30 mm. The sensing components may be placed in pairs, wherein the spacing between the two components of each pair is substantially smaller than the abovementioned repeated spacing between pairs. It is particularly preferred that the space between the end portions of adjacent first electrodes is at least 0.4 mm, the space between the end portions of adjacent second electrodes is at least 50 mm, and the thickness of the PTC element is at least 3 mm.

In another embodiment, the apparatus may be provided with a resistance positioned in a way to straddle and connect over the gaps between each pair of adjacent first electrodes. This resistance, which may be in the form of a conductive polymer element, is connected in parallel to the adjacent set of sensing components. The resistance value of the resistance is substantially larger at 23° C. than the pair of adjacent sensing components, and substantially smaller at 90° C. than the pair of adjacent sensing components.

The temperature-sensing apparatus may be made by a process comprising the following steps:

(A) Providing a laminar element comprising a sheet having opposite first and second surfaces and composed of a conductive polymer composition exhibiting PTC behavior, and first and second metal sheets, e.g. foils, attached to the first and second surfaces of the sheet, respectively;

(B) Forming a plurality of first grooves by removing a first plurality of parallel strips from the first metal sheet;

(C) Forming a plurality of second grooves by removing the a second plurality of parallel strips from the second metal sheet. The first and second grooves are parallel to each other, staggered, and not overlapping and may be formed by etching the metal foil sheet.

(D) Preparing a plurality of components in tape form by dividing the product resulting from step (C) along lines perpendicular to the first and second grooves; and (E) Forming a polymer insulating component around each component in tape form.

The temperature-sensing apparatus may be used as part of a battery assembly which also comprises a plurality of batteries, wherein each battery is provided with at least one sensing component in thermal contact therewith.

The invention is illustrated by the drawings, in which FIG. 1 shows a battery assembly which is one aspect of the invention. FIG. 1 is a set of batteries provided with a temperature-sensing apparatus according to the invention. In FIG. 1, a plurality of secondary batteries (six are shown in the figure) are connected in series and are to be charged. The symbol 10 denotes the secondary batteries connected in series; the figure has omitted the charging device connected to the secondary batteries 10 for charging. A temperature-sensing apparatus 11 with a plurality of temperature sensing components linked together (for the six secondary batteries in the figure) is provided in contact with the secondary batteries 10 to sense the temperatures of the secondary batteries 10. A power source 12 and a current measuring device 13 are connected electrically in series between the two ends of this temperature-sensing apparatus 11.

The operation of the set of secondary batteries provided with a temperature-sensing apparatus according to the invention is explained using FIG. 1. Voltage is applied to the temperature-sensing apparatus 11 from the power source 12, as a result of which current runs in a closed loop comprising this temperature-sensing apparatus 11, the power source 12, and the current measuring device 13. The surface temperature of the secondary batteries 10 during charging is transmitted to the temperature-sensing apparatus 11 by contact. The current measuring device 13 measures the current running through the closed loop; if the current becomes larger than the specified value for the secondary batteries in a normal state, it is determined that the temperature of one or some of the secondary batteries 10 being measured has risen and therefore an abnormality has occurred, and the charging process is stopped.

Figure 2:
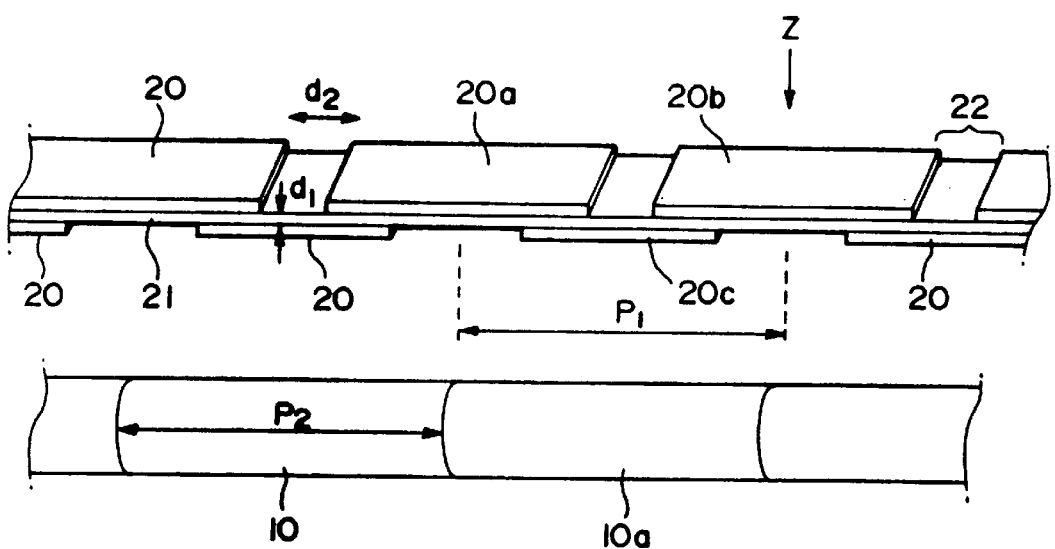
FIG. 2 is an enlarged schematic view of a temperature-sensing apparatus and secondary batteries shown in FIG. 1.

The structure of the temperature-sensing apparatus 11 is explained in more detail using FIG. 2. FIG. 2 is a perspective view of enlarged and separated sections of the temperature-sensing apparatus 11 and the secondary batteries 10, the two being in mutual contact under actual-use conditions. In the figure, the length of P2 denotes a single secondary battery. Electrode sheets 20, composed of Cu—Ni foil, are provided intermittently in contact with the top and bottom parts of the PTC element 21, which is a conductive polymer layer exhibiting PTC behavior that changes based on the specified temperature characteristic of the polymer used. Between each electrode sheet is a gap denoted by the symbol 22; the PTC element 21 is exposed at this gap 22. The upper part of the range shown by P1 denotes a single temperature-sensing component, comprising the right half of the electrode sheet 20a (a first electrode), the electrode sheet 20c (a second electrode), and the left half of the electrode sheet 20b (a first electrode). In this first embodiment, the structure of the temperature-sensing apparatus comprises a set of six of these temperature-sensing components, the same number as secondary batteries. In this embodiment, when viewed from the direction Z in FIG. 2, the electrode sheets 20a and 20b on the top part of the PTC polymer element 21 overlap with the electrode sheet 20c on the bottom part of the PTC polymer element 21, with the PTC element 21 in between as shown in the figure.

Figure 3:
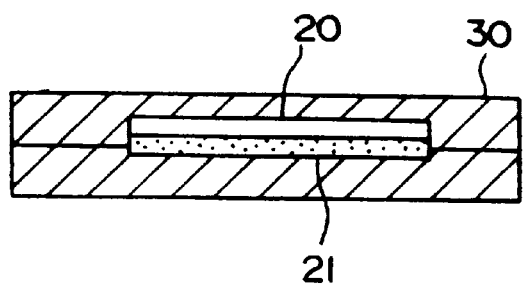
FIG. 3 is a cross-section of a temperature-sensing apparatus according to the invention shown in FIG. 2.

In actual use, this temperature-sensing section P1 is placed in contact with a single secondary battery 10a to sense the temperature of the secondary battery 10a. Also, if the thickness of the PTC element 21 is d1 and the spacing between the electrode sheets is d2 as shown in the figure, each electrode sheet in this embodiment is placed so that d2>d1. The entire top and bottom of this set of temperature-sensing components are covered by a transparent plastic insulating sheet to form the temperature-sensing apparatus 11. FIG. 3 shows a cross-section of the temperature-sensing apparatus in the direction Z in FIG. 2, wherein the symbol 30 is the transparent plastic sheet.

The principle of temperature sensing by the temperature-sensing component in this embodiment is described using the temperature-sensing component P1 in FIG. 2 as an example. In FIG. 2, the current flows left to right, to correspond with FIG. 1. The path of the current supplied by the power source 12 flows from the electrode sheet 20a to the electrode sheet 20c via the PTC element 21; after having flowed through this electrode sheet 20c, the current flows to the electrode sheet 20b via the PTC element 21. This is because, since d2>d1 as described above, the electrical resistance in this path is smaller than the electrical resistance of the current path flowing from the electrode sheet 20a directly to the electrode sheet 20b. Thus, the current flows in a zigzag fashion between the top and bottom of each temperature-sensing component.

If the temperature of the secondary cell 10a to be measured is normal, the electrical resistance of the PTC element 21 is also low, and the current flowing through the above path is measured by the current measuring device 13 as a normal value. However, if any damage occurs on the secondary battery and the temperature rises to an abnormal (i.e. high) range, the electrical resistance of the PTC element 21 in contact with the secondary battery is increased through this temperature rise, thereby increasing the total resistance of the abovementioned path. Thus the current measured on the current measuring device 13 increases and the abnormality in the secondary cell can be detected.

Figure 4:
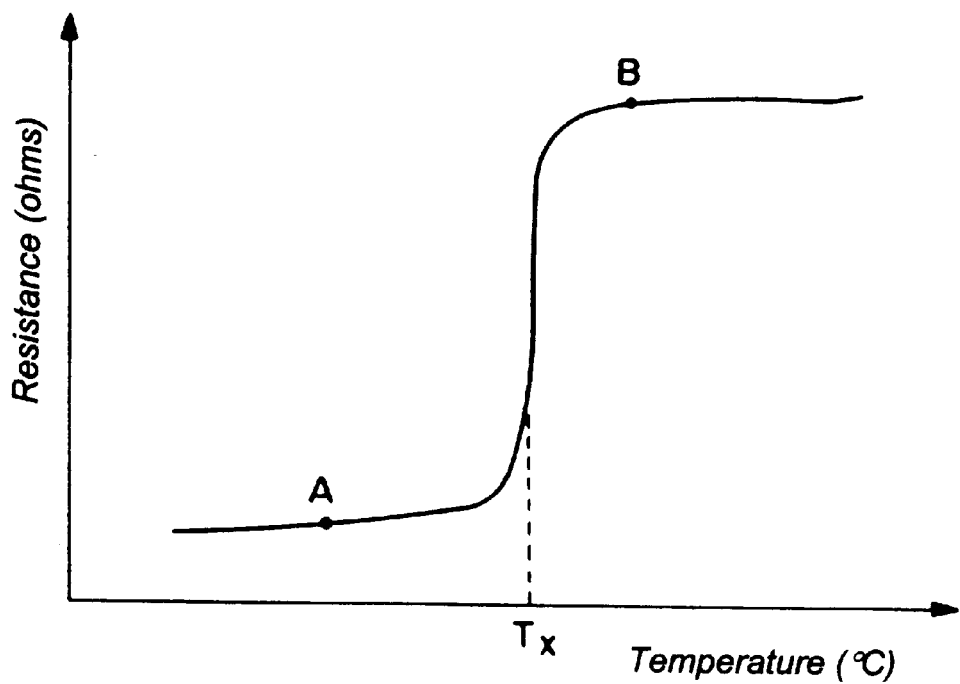
FIG. 4 is a graph showing the resistance versus temperature characteristics of the PTC material used in the temperature-sensing apparatus of the invention.

FIG. 4 shows a curve illustrating the relationship between the changes in electrical resistance of the PTC element and changes in temperature of the secondary battery. In this example, the electrical resistance shows a sharp change in the vicinity of a temperature Tx. When point A in the normal temperature range and point B in an abnormal (i.e. high) temperature range caused by a temperature rise are compared, the electrical resistance at point B is increased, e.g. by about several hundred times.

Figure 5:
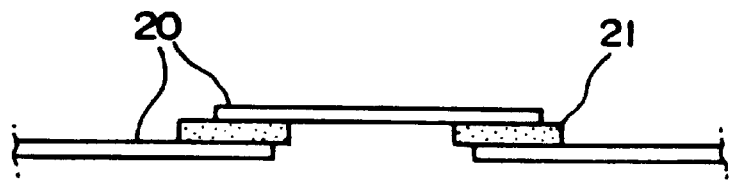
FIG. 5 is a cross-section of another embodiment of a temperature-sensing apparatus according to the invention.

FIG. 5 further illustrates the invention, showing a cross-section of a single temperature-sensing component which is part of the temperature-sensing apparatus. Here, the PTC element 21 is not a continuous layer as in the embodiment shown in FIG. 2, but exists in parts sandwiched by opposing parts of the top and bottom electrode sheets 20 in a temperature sensing component.

Figure 6:
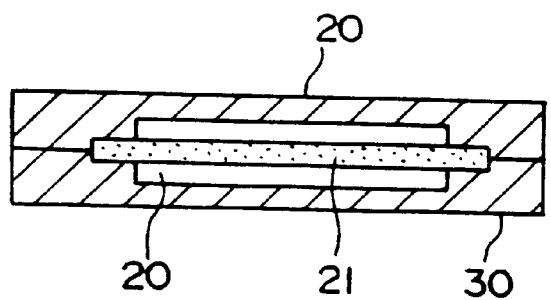
FIG. 6 is a cross-section of the embodiment shown in FIG. 7.

FIG. 6 is a cross-section, perpendicular to FIG. 5, of the temperature-sensing component where the top and bottom electrode sheets 20 and the PTC element 21 are present.

As in FIG. 3 described above, the top and bottom of the temperature-sensing apparatus are covered by an insulating transparent plastic sheet 30. In this embodiment, the PTC element 21 is smaller in area both in its entire length and in each temperature-sensing component, thereby having the effect of responding more sensitively to the temperature changes of the secondary battery to be measured.

Figure 7:
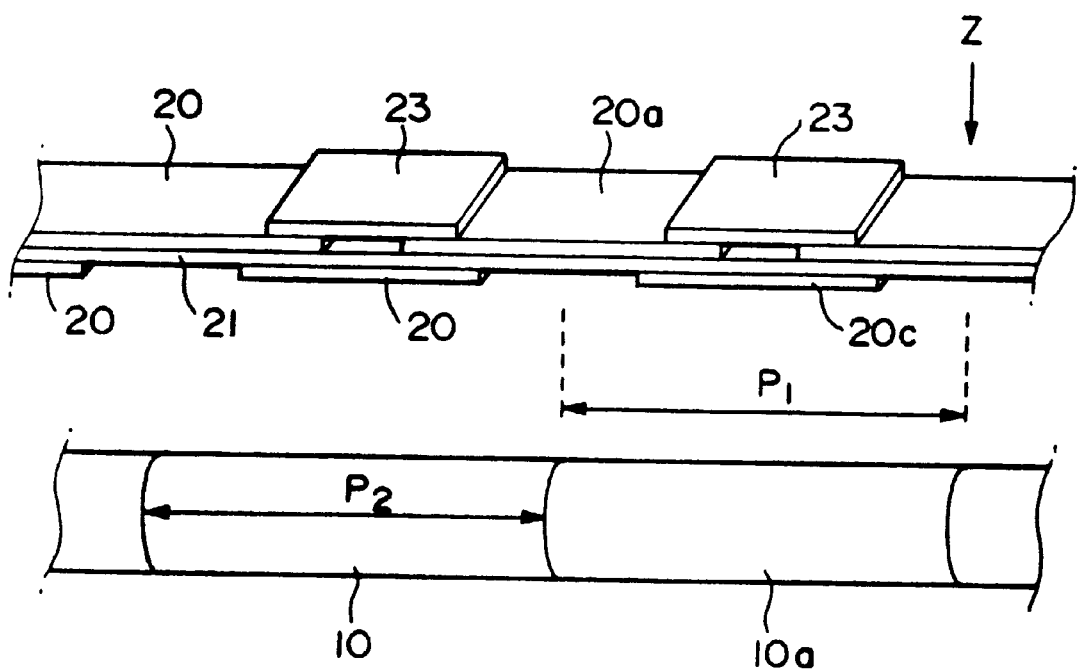
FIG. 7 is a perspective schematic view of another embodiment of a temperature-sensing apparatus and secondary batteries according to the invention.

Another embodiment is shown in FIG. 7. The figure is a partial enlarged cross-section of the temperature-sensing apparatus. As in FIG. 2, the top part of the range shown by P1 denotes a single temperature-sensing section; in actual use, this is placed in contact with a single secondary cell 10a to measure its temperature. In this case, in addition to the example of the embodiment shown in FIG. 2, a ZTC layer 23, which is a conductive polymer layer having zero temperature coefficient (i.e. the resistance is relatively constant with increasing temperature), is provided intermittently in contact with and covering the intermittent sections of the electrode sheet 20. The other parts of the figure are the same as FIG. 2. In this embodiment, if there is any breakdown in the PTC element 21 making it impossible for the current to flow through the layer, the current will flow through the electrode sheet 20 and the ZTC layer 23 and allow any abnormality or failure of the temperature-sensing apparatus itself to be detected. This embodiment is particularly effective in sensing the temperature of a plurality of batteries such as secondary batteries carried on an electric vehicle.

Figure 8:
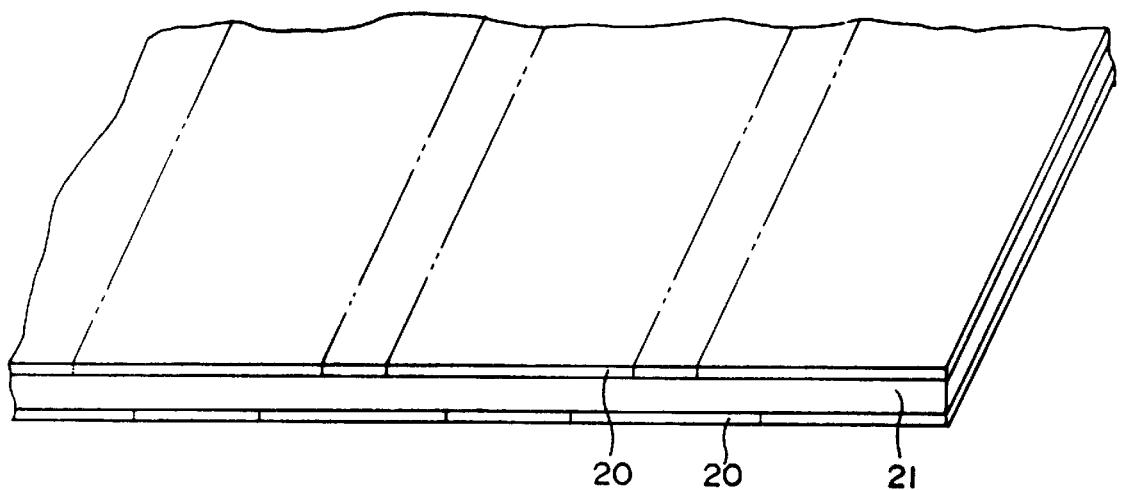
FIGS. 8 and 9 are perspective views showing the process for manufacturing a temperature-sensing apparatus according to the invention.
Figure 9:
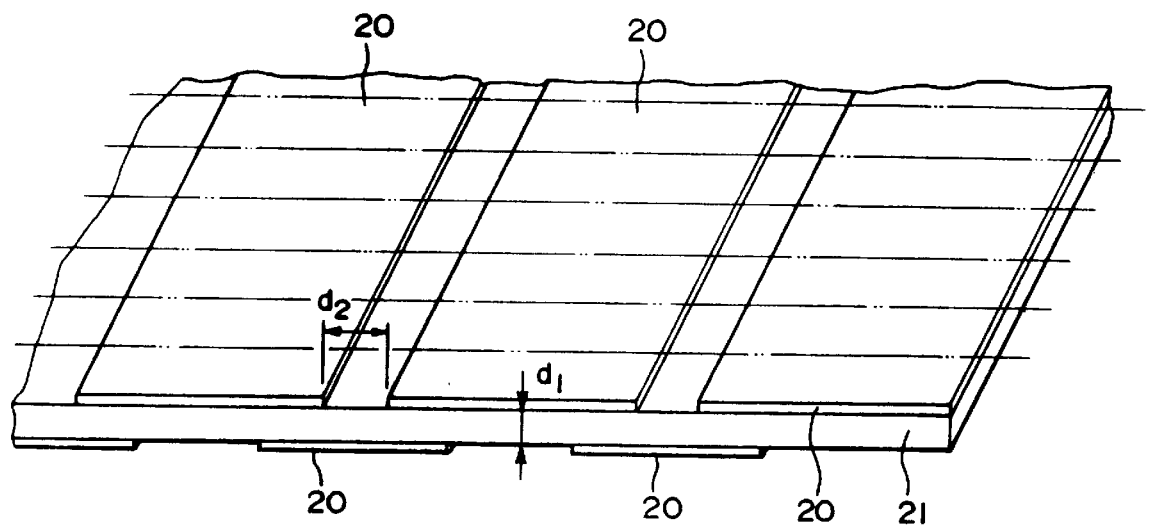

The following describes the manufacturing process for making the temperature-sensing apparatus, using the embodiment shown in FIGS. 1 and 2 as an example. First, in FIG. 8, a PTC layer 21 having a uniform thickness of d1 is prepared. Sandwiching this PTC layer 21, electrode sheets 20 are placed in contact on the top and bottom to make a substrate. Next, masking is applied in wide bands, shown by double-dotted lines in FIG. 8, on the electrode sheets 20 on the top and bottom of the PTC layer 21 in order to remove the section shown as d2 in FIG. 9. Following this, etching is performed to remove the metal electrode sheets 20 with the exception of the sections masked as above, which remain as electrode sheets spaced apart at a distance of d2. After this, the substrate is cut in the transverse direction following the double-dotted lines in FIG. 9. The strips thus obtained are individually sandwiched from above and below using a transparent plastic sheet, after which electrodes are attached on both ends by welding to obtain a plurality of temperature-sensing apparatuses.

By having a structure as described above, the temperature-sensing apparatus according to the invention can be manufactured, even when the plurality of secondary batteries to be measured is connected in series in a different shape, e.g. an L-shape, for example, to fit the contour of the L-shape so that it can be positioned in contact along the secondary batteries. Further, the manufacturing method described above is relatively simple, allows stability in manufacture, and is thus suitable for volume production.

Although the invention has been described through the explanation above primarily for application to secondary batteries, it is not limited to secondary batteries but may be usefully applied with great effect to other objects that require temperature increases to be monitored.

A single apparatus may be used to sense the temperature of a single secondary battery or a plurality of secondary batteries connected in series. Further, when the process to manufacture the temperature-sensing apparatus according to the invention is used, the cost of manufacture is low, the reliability during use is high because there are few welded sections, and different shapes can be manufactured.

What is claimed is:

1. An elongate temperature-sensing apparatus which can be connected to an electrical power supply to provide a sensor for monitoring the temperature of a plurality of batteries, the apparatus comprising
   (A) a positive temperature coefficient (PTC) element which
      (1) is in the form of a continuous elongate tape having opposite first and second surfaces, and
      (2) comprises a conductive polymer exhibiting PTC behavior;
   (B) a plurality of first electrodes which
      (1) are secured to the first surface of the PTC element, and
      (2) are longitudinally spaced apart from each other;
   (C) a plurality of second electrodes which
      (1) are secured to the second surface of the PTC element, and (2) are longitudinally spaced apart from each other, the first and second electrodes being in a staggered and overlapping relationship, so that each electrode has (a) a central portion which does not overlap an electrode on the opposite surface and (b) two end portions which overlap respective end portions of adjacent electrodes on the opposite surface;

(D) a polymeric insulating jacket which surrounds the PTC element and the first and second electrodes, (E) a plurality of longitudinally spaced-apart sensing components, each sensing component comprising
  (1) an overlapping end portion of one of the first electrodes,
  (2) an overlapping end portion of one of the second electrodes, and
  (3) a portion of the PTC element, through which current runs transversely between the overlapping end portions of the electrodes when the apparatus is connected to a power supply; and (F) a plurality of longitudinally spaced-apart connecting components, each connecting component
  (1) connecting two adjacent sensing components electrically in series, and
  (2) comprising
    (a) a portion of the PTC element, and
    (b) a central portion of one of the first electrodes or a central portion of one of the second electrodes, through which current will run longitudinally when the apparatus is connected to a power supply.

2. A temperature-sensing apparatus according to claim 1 wherein the conductive polymer has a volume resistivity of at most 8 ohm-cm at 23° C.

3. A temperature-sensing apparatus according to claim 1 wherein the resistance value of the sensing components is at most 5 ohms at 23° C. and at least 100 ohms at 90° C.

4. A temperature-sensing apparatus according to claim 1 wherein each of the first electrodes and second electrodes is a metal foil electrode.

5. A temperature-sensing apparatus according to claim 1 wherein the sensing components are substantially identical to one another and are placed uniformly spaced apart on the temperature-sensing apparatus.

6. A temperature-sensing apparatus according to claim 5 wherein the spacing between corresponding parts of adjacent sensing components is 10 mm to 30 mm.

7. A temperature-sensing apparatus according to claim 1 wherein the sensing components are placed in pairs.

8. A temperature-sensing apparatus according to claim 7 wherein the spacing between the two components of each pair is less than 10 mm to 30 mm.

9. A temperature-sensing apparatus according to claim 7 wherein the spacing between the end portions of adjacent first electrodes is at least 0.4 mm, the spacing between the end portions of adjacent second electrodes is at least 50 mm, and the thickness of the PTC element is at least 3 mm.

10. A temperature-sensing apparatus according to claim 1 wherein the apparatus comprises a resistance which straddles and connects over a gap between each pair of adjacent first electrodes, said resistance being connected in parallel to the adjacent set of sensing components.

11. A temperature-sensing apparatus according to claim 10 wherein the resistance straddling and connecting over a gap between the pair of adjacent first electrodes has a value which is
  (A) substantially larger at 23° C. than the resistance of the pair of adjacent sensing components, and
  (B) substantially smaller at 90° C. than the resistance of the pair of adjacent sensing components.

12. A temperature-sensing apparatus according to claim 10 wherein the resistance comprises a conductive polymer.

13. A temperature-sensing apparatus which comprises
  (A) a plurality of longitudinally spaced-apart sensing components, each sensing component comprising
    (1) a positive temperature coefficient (PTC) element which
      (a) is in the form of a laminar sheet having opposite first and second surfaces, and
      (b) comprises a conductive polymer exhibiting PTC behavior;
    (2) a first electrode which is secured to the first surface of the PTC element, and
    (3) a second electrode which is secured to the second surface of the PTC element, and
  (B) a plurality of longitudinally spaced-apart connecting components, each connecting component lying between two adjacent sensing components and the connecting components being alternately connected
    (1) to the first electrodes of the adjacent sensing components, and
    (2) to the second electrodes of the adjacent sensing components;

whereby, when the apparatus is connected to a power supply, current runs transversely through the PTC elements and longitudinally through the connecting components.

14. A battery assembly comprising
  (A) a plurality of batteries, and
  (B) a temperature-sensing apparatus as claimed in claim 1, wherein each battery is provided with at least one sensing component in thermal contact therewith.

15. An assembly according to claim 14 wherein the batteries are secondary batteries.

* * * * *